US005132511A

United States Patent [19]

Labrot et al.

[11] Patent Number: 5,132,511

[45] Date of Patent: Jul. 21, 1992

[54] PLASMA TORCH PROVIDED WITH AN ELECTROMAGNETIC COIL FOR ROTATING ARC FEET

[75] Inventors: Maxime Labrot, Bordeaux; Serge G. R. Muller, St. Medard En Jalles; Jean Feuillerat; Patrick Lautissier, both of Bordeaux, all of France

[73] Assignee: Societe Anonyme dite: Aerospatiale Societe Nationale Industrielle, Paris, France

[21] Appl. No.: 609,993

[22] Filed: Nov. 7, 1990

[30] Foreign Application Priority Data

Nov. 8, 1989 [FR] France ............................... 89 14675

[51] Int. Cl.[5] ............................................... B23K 9/00

[52] U.S. Cl. .......................... 219/121.49; 219/121.48; 219/123; 219/75

[58] Field of Search ...................... 219/121.48, 121.49, 219/121.5, 121.52, 121.54, 121.55, 74, 75, 76.16, 123; 313/231.31, 231.41, 231.51

[56] References Cited

U.S. PATENT DOCUMENTS

| | | | |
|---|---|---|---|
| 3,832,519 | 8/1974 | Wolf et al. | 219/383 |
| 3,924,092 | 12/1975 | Lessmann et al. | 219/123 |
| 4,034,250 | 5/1977 | Kiselev et al. | 313/231.5 |
| 4,219,726 | 8/1980 | Meyer et al. | 219/123 |
| 4,227,031 | 10/1980 | Paton et al. | 219/123 |
| 4,535,225 | 8/1985 | Wolf et al. | 219/123 |
| 4,668,853 | 5/1987 | Fey et al. | 219/121.49 |

FOREIGN PATENT DOCUMENTS 0032100 7/1981 European Pat. Off. .

*Primary Examiner*—Mark H. Paschall

*Attorney, Agent, or Firm*—Marshall, O'Toole, Gerstein, Murray & Bicknell

[57] ABSTRACT

A plasma torch includes two axially spaced tubular electrodes and an electromagnetic coil for rotating an electric arc formed between the electrodes. Each electrode is held in a support, at least one support containing a cylindrical cooling chamber through which an electrically nonconductive cooling fluid can be passed. The electromagnetic coil divides the cooling chamber into two annular spaces which are interconnected at one end.

8 Claims, 1 Drawing Sheet

PLASMA TORCH PROVIDED WITH AN ELECTROMAGNETIC COIL FOR ROTATING ARC FEET

FIELD OF THE INVENTION

The present invention concerns plasma torches in which the plasma is obtained by heating a gas by an electric arc produced between two electrodes.

BACKGROUND OF THE INVENTION

Many embodiments of plasma torches currently exist. Generally speaking, a plasma torch, such as the one mentioned in the document U.S. Pat. No. 3,301,995, includes two coaxial tubular electrodes, each of the electrodes being disposed in a support surrounding it. The plasma torch also comprises means to produce the initiating of an electric arc between the two electrodes and means to inject a plasma gas, such as air, between the two electrodes simultaneously with the electric arc. Means for cooling the electrodes are also provided in each electrode support and are normally defined by a sealed cylindrical chamber provided in each support, a cylindrical separation wall dividing the sealed chamber into two concentric annular spaces communicating with each other at one end of said wall and through which a cooling fluid circulates.

In addition, as mentioned for example in the documents U.S. Pat. No. 3,301,995 EP-A-0 032 100, so as to avoid any premature wear of the electrodes, means are provided to move the catching feet of the electric arc onto the internal surfaces of the tubular electrodes. Generally speaking, these means are defined by at least one electromagnetic coil surrounding one of the electrode supports. Thus, by modulating the axial magnetic field generated by the coil when it is excited, the catching feet of the electric arc move around the internal surfaces of the electrodes, thus avoiding the formation of local craters and the rapid destruction of the electrodes.

However, the fitting of such a magnetic coil around the electrode carrier support requires significantly increasing the spatial requirement of the plasma torch so that in certain applications the plasma torches equipped as above do not satisfy the volume and shape requirements.

So as to reduce the external spatial requirement imposed by the coils, one solution consists of disposing them in an internal volume provided in each electrode support, as mentioned in the document U.S. Pat. No. 3,832,519. Nevertheless, the spatial requirement gain is not significant as the support is bigger, and in addition, the coils are provided with complex internal cooling circuits.

SUMMARY OF THE INVENTION

The object of the present invention is to overcome these drawbacks and concerns an electric arc plasma torch, whose arrangement of the means for moving the electric arc does not result in the volume of said torch being increased or involve additional technical complications.

To this effect, the plasma torch of the type comprising:

two tubular coaxial axially spaced electrodes, each electrode being disposed in a support;

means for cooling said electrodes passed through by a cooling fluid, said cooling means of at least one electrode including a sealed cylindrical chamber provided in the corresponding support and separated by a cylindrical separation wall dividing the chamber into two annular spaces communicating with each other at one end of said wall and through which said cooling fluid circulates;

means to produce the initiating of an electric arc between the two electrodes;

means for injecting a plasma gas between the two electrodes; and electromagnetic oil means to move the catching feet of the electric arc onto the internal surfaces of said electrodes, is notable in that according to the invention the cooling fluid of said electrode, whose sealed cylindrical chamber comprises the separation wall, is electrically nonconducting and in that said electromagnetic coil acts as said cylindrical separation wall.

Thus, by means of the invention, the spatial requirement previously imposed by the electromagnetic coil is totally suppressed since the latter is then integrated into the electrode carrier support thus replacing the cylindrical separation wall, initially provided in the support, of the cooling means.

In addition, it shall be observed that said coil is then effectively cooled by the fluid running over the two concentric annular spaces between which the electromagnetic coil is disposed.

Advantageously, said electromagnetic coil extends roughly over the entire length of the electrode and preferably is associated with the support surrounding the upstream electrode (with respect to circulation of the plasma gas).

In one preferred embodiment, said electromagnetic coil is defined by two concentric windings with contiguous spires, a casing made of a nonconducting material being inserted between the two concentric spire windings. This nonconducting casing thus constitutes a sealed separation wall allowing the cooling fluid to run over the two annular spaces.

According to another characteristic, the two spire windings may be obtained from a continuous metallic wire. This wire preferably has a rectangular section so that each of said contiguous spire windings then has a smooth surface.

Furthermore, said electromagnetic coil is connected by one of its ends to an electric power line and by the other end to a ring integral with the corresponding support. The electric power line preferably travels through the electrically nonconducting cooling fluid intake pipe.

BRIEF DESCRIPTION OF THE DRAWINGS

The figures of the accompanying drawing shall show how the invention may be embodied. Identical references on these figures denote similar elements.

DETAILED DESCRIPTION OF THE PREFERRED EMBODIMENTS

Figure 1:
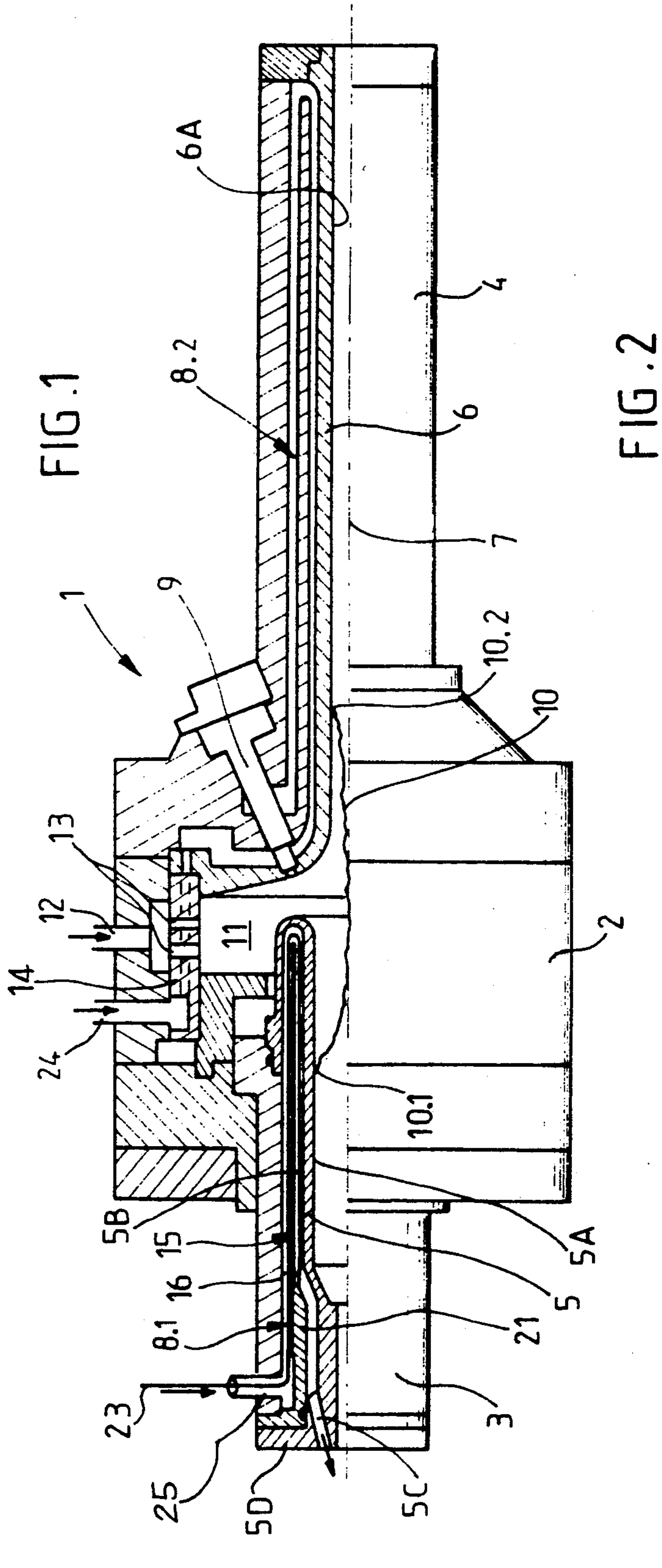
FIG. 1 diagrammatically represents a half-view in longitudinal section contiguous to an external half-view of a particular embodiment of the plasma torch of the invention.

With reference to FIG. 1, the plasma torch 1 comprises a body 2 including two cylindrical supports 3 and 4. An upstream electrode or cathode 5 is housed inside the support 3 and in identical fashion a downstream electrode or anode 6 is housed inside the support 4. These electrodes 5 and 6 have a general tubular shape and have a common axis 7 and are spaced from each other along said axis and connected to an electric power source by circuits (not shown) of a known type.

The plasma torch 1 also includes means 8.1 and 8.2 for cooling the electrodes and which are normally provided in each of the supports 3 and 4, these means to be described subsequently.

Furthermore, in order to initiate an electric arc between the two electrodes 5 and 6, an auxiliary starting electrode 9, for example, is mounted sliding on the support 4 by being electrically linked to the downstream electrode 6. In this case, the short-circuit initiating of the electric arc is effected by placing the auxiliary electrode 9 in contact with the upstream electrode 5. FIG. 1 shows the electric arc 10 thus generated whose catching feet 10.1 and 10.2 are situated on the internal surfaces, respectively 5A and 6A, of the electrodes 5 and 6.

Once the electric arc 10 appears, a plasmagene gas, such as air, is injected into an injection chamber 11 between the electrodes 5 and 6. In order to effect this, the gas, derived from a known feeding circuit (not shown), traverses a passage 12 provided in the body 1 and then transversal injection orifices 13 provided in a cylindrical part 14 surrounding the opposite ends of the electrodes so as to then open into the chamber 11, the thermic plasma leaving via the downstream tubular electrode 6.

So as to avoid any premature wear of the electrodes 5 and 6, the plasma torch 1 includes means to move the catching feet of the generated electric arc around the internal surfaces of the tubular electrodes 5 and 6. These means are defined by at least one electromagnetic coil 15 associated in this embodiment with the support 3 of the upstream electrode 5.

Figure 2:
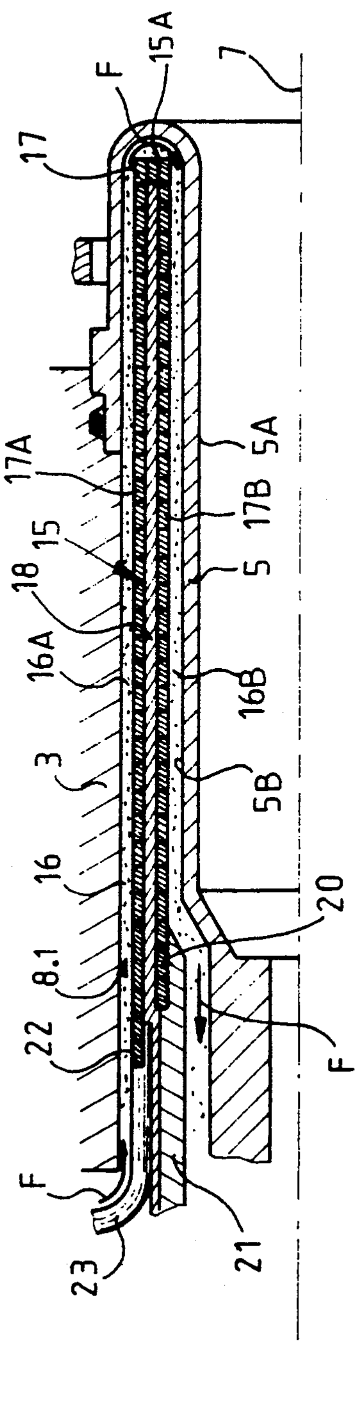
FIG. 2 is a half-view in increased section of the electromagnetic coil disposed in the support of the upstream electrode.

According to the invention, the electromagnetic coil 15 is integrated in the cooling circuit 8.1 of the electrode 5. With reference to FIGS. 1 and 2, it can be seen that the cooling circuit 8.1 is defined by a sealed cylindrical chamber 16 provided between the support 3 and the external surface 5B of the electrode 5 by being separated by the electromagnetic coil 15 into two concentric annular spaces 16A and 16B through which the cooling fluid circulates, said annular spaces communicating with each other at the downstream end 15A of said coil 15.

The electromagnetic coil 15 thus acts as a wall for separating the annular spaces 16A and 16B so that this disposition does not require any additional space for the plasma torch.

The cooling fluid is electrically nonconducting and may be deionized water. This fluid, derived from a known feeding circuit (not shown), arrives via a pipe 25 opening into the sealed chamber 16 so as to circulate inside the annular space 16A between the support 3 and the coil 15 and then inside the annular space 16B between the coil 15 and the external surface 5B of the electrode and then come out via a passage 5C provided in the rear end 5D of the electrode 5 in the direction of said circuit. Circulation of the fluid is indicated by arrows F. Thus, it can be seen that the electromagnetic coil 15, which extends around the electrode 5, is optimally cooled by the cooling fluid.

In one preferred embodiment shown on FIG. 2, the electromagnetic coil 15 is defined by two concentric windings 17A and 17B with contiguous spires obtained from a continuous metallic wire 17 made, for example, of copper. Between the two spire windings 17A and 17B, a casing 18 made of a nonconducting material is disposed, this casing thus constituting a sealed wall separating the two annular spaces 16A and 16B. In addition, it can be seen that the wire of the spires forming the windings of the coil 15 advantageously has a solid rectangular section.

The coil 15 is fixed by one 20 of its ends to a metallic ring 21 conforming one section of the cooling circuit and inserted between the support 3 and the rear end 5D of the electrode 5, whereas the other end 22 of the coil, isolated from the metallic mass, is connected to an electric power line 23. Advantageously, this power line 23 travels inside the cooling fluid intake pipe 17 so that it is thus effectively cooled.

The cooling circuit 8.2 of the downstream electrode 6 is fed with cooling fluid via a pipe 24. The various feedings of plasma gas and cooling fluid, as well as the electric feeding of the electrodes and the coil, are of a known type and are connected to a control system ensuring the good functioning of the plasma torch in accordance with the criteria assigned to it.

What is claimed is:

1. A plasma torch comprising:
   - two tubular coaxial axially-spaced electrodes, each electrode being disposed in a support;
   - means to inject a plasma gas between the two electrodes;
   - means to initiate an electric arc between the two electrodes;
   - means for cooling at least one of said electrodes by means of an electrically nonconductive cooling fluid, said cooling means comprising a sealed cylindrical chamber between said one of said electrodes and its corresponding support, through which said cooling fluid passes; and
   - a cylindrical electromagnetic coil for moving the catching feet of said electric arc onto the internal surfaces of said electrodes, said electromagnetic coil forming a cylindrical separation wall dividing said sealed cylindrical chamber into two annular spaces communicating with each other at one end of said wall and through which said electrically nonconductive cooling fluid can circulate.

2. Plasma torch according to claim 1, wherein said electromagnetic coil is associated with the support surrounding the upstream electrode with respect to circulation of the plasma gas.

3. Plasma torch according to claim 1, wherein said electromagnetic coil extends approximately over the entire length of the electrode.

4. Plasma torch according to claim 1, wherein said electromagnetic coil is defined by two concentric windings with contiguous spires, a casing made of a nonconducting material being inserted between the two spire concentric windings.

5. Plasma torch according to claim 4, wherein the two spire windings are obtained from a continuous metallic wire.

6. Plasma torch according to claim 5, wherein the wire of the coil has a rectangular section.

7. Plasma torch according to claim 1, wherein said electromagnetic coil is connected by one of its ends to an electric power line and by the other end to a ring integral with said corresponding support.

8. Plasma torch according to claim 7, wherein said electric power line travels through the electrically non-conducting cooling fluid intake pipe.

* * * * *